(12) United States Patent
O'Connor et al.

(10) Patent No.: US 6,305,749 B1
(45) Date of Patent: Oct. 23, 2001

(54) HEADREST

(76) Inventors: Richard W. O'Connor, 3635 Webster St., San Francisco, CA (US) 94123; Brian H. Steuer, 1090 Cloud Ave., Menlo Park, CA (US) 94025

( * ) Notice: Subject to any disclaimer, the term of this patent is extended or adjusted under 35 U.S.C. 154(b) by 0 days.

(21) Appl. No.: 09/667,011

(22) Filed: Sep. 20, 2000

Related U.S. Application Data

(63) Continuation-in-part of application No. 09/374,077, filed on Aug. 12, 1999, now Pat. No. 6,123,389.
(60) Provisional application No. 60/096,426, filed on Aug. 13, 1998.

(51) Int. Cl.[7] .................................................. A47C 1/10
(52) U.S. Cl. ........................ 297/397; 297/399; 5/636; 5/640
(58) Field of Search ................................... 297/397, 399, 297/391; 5/636, 640, 643

(56) References Cited

U.S. PATENT DOCUMENTS

| 2,464,435 | 3/1949 | Conradt | 297/397 |
| 2,582,571 | 1/1952 | Thoma | 297/397 |

(List continued on next page.)

OTHER PUBLICATIONS

*Qantas Launches A New Era For Business Class*, Times Business Publications, Business Times (Singapore), pp. 10,11, Nov. 22, 1994.

*Weekender: Asian Crisis Offers Opportunities For SQ*, BusinessWorld Publishing Corporation, BusinessWorld, p. 32, Sep. 25, 1998.

(List continued on next page.)

*Primary Examiner*—Peter M. Cuomo
*Assistant Examiner*—Rodney B. White
(74) *Attorney, Agent, or Firm*—Blakely Sokoloff Taylor & Zafman, LLP

(57) ABSTRACT

A headrest for supportably engaging a person's head at rest to substantially inhibit neck strain is disclosed. In one embodiment, the headrest includes a center portion for supporting a neck portion of a person's head and first and second wing portions for supporting first and second side portions, respectively, of the person's head, and padding covering at least a portion of the center portion and the first and second wing portions. In another embodiment, the center portion is located distally relative to the first and second wing portions, and is adapted to frictionally and/or abuttingly engage the back surface of a seatback to releasably secure the headrest to a seatback. In this embodiment, the headrest includes substantially U-shaped first and second intermediate portions extending between the first and second wing portions and first and second end portions of the center portion, respectively, for pinching or compressively engaging front and back surfaces of an upper portion of the seatback.

51 Claims, 12 Drawing Sheets

U.S. PATENT DOCUMENTS

| | | | |
|---|---|---|---|
| 2,587,196 | | 2/1952 | Morecroft .......................... 297/397 X |
| 2,613,731 | | 10/1952 | Roginski ............................... 297/399 |
| 2,827,110 | | 3/1958 | Rising .................................... 297/399 |
| 2,983,310 | | 5/1961 | Warlick et al. ....................... 297/399 |
| 3,283,344 | | 11/1966 | Blanchard ........................... 5/636 X |
| 3,537,750 | | 11/1970 | Lohr .................................. 297/397 X |
| 4,030,781 | | 6/1977 | Howard ................................ 297/397 |
| 4,031,578 | | 6/1977 | Sweeney et al. ..................... 5/336 X |
| 4,440,443 | | 4/1984 | Nordskog ............................. 297/397 |
| 5,074,574 | | 12/1991 | Carwin ............................. 297/397 X |
| 5,135,283 | | 8/1992 | Cassese et al. ...................... 297/397 |
| 5,345,633 | | 9/1994 | Harnish ............................ 297/397 X |
| 5,467,782 | | 11/1995 | Wiseman .................................. 5/636 |
| 5,505,523 | | 4/1996 | Wang ................................ 297/397 X |
| 5,544,378 | | 8/1996 | Chow .................................... 5/640 X |
| 5,669,665 | | 9/1997 | Nowak .............................. 297/397 X |
| 5,800,019 | | 9/1998 | Knightlinger .................... 279/397 X |
| 5,868,471 | * | 2/1999 | Graham et al. ....................... 297/397 |
| 5,918,933 | | 7/1999 | Hutchinson et al. ............ 297/397 X |
| 5,997,091 | * | 12/1999 | Rech et al. ............................ 297/391 |
| 6,123,389 | * | 9/2000 | O'Connor ............................. 297/397 |
| 6,158,813 | * | 12/2000 | Karash ............................. 297/397 X |
| 6,220,668 | * | 4/2001 | Scheffzuck ........................... 297/391 |

OTHER PUBLICATIONS

Sloan, Gene, *Culture Defines Singapore Airlines Executive Cheong Choong Kong Takes A Hard Look At The Industry,* Gannett Company, Inc., USA Today, Section: LIFE, p. 8D, Oct. 2, 1998.

Megatops Take Off In First Class Style; James O'Brien Looks At Singapore Airlines' Pounds 250 Million Revamp Of Its Passenger Services, Midland Independent Newspapers plc, Birmingham Post, p. 21, Oct. 7, 1998.

Singapore Airlines Announces S$500 Million (US $300 Million) Product Launch, PR Newswire Association, Inc., PR Newswire, Section: Financial News, Sep. 16, 1998.

India—S'pore Airlines Upgrading Facilities, FT Asia Intelligence Wire, Business Line, Section: Business, Sep. 13, 1998.

Thomas, Geoffrey, SIA ready Too Spend Despite Asian Recession, The McGraw–Hill Companies, Inc. Aviation Week and Space Technology, Section: Air Transport; vol. 149, No. 13; p. 63, Sep. 28, 1998.

Singapore To Spend $300 Million On Total Airline Upgrade, The McGraw–Hill Companies, Inc., Aviation Daily, vol. 333, No. 52; p. 451, Sep. 14, 1998.

* cited by examiner

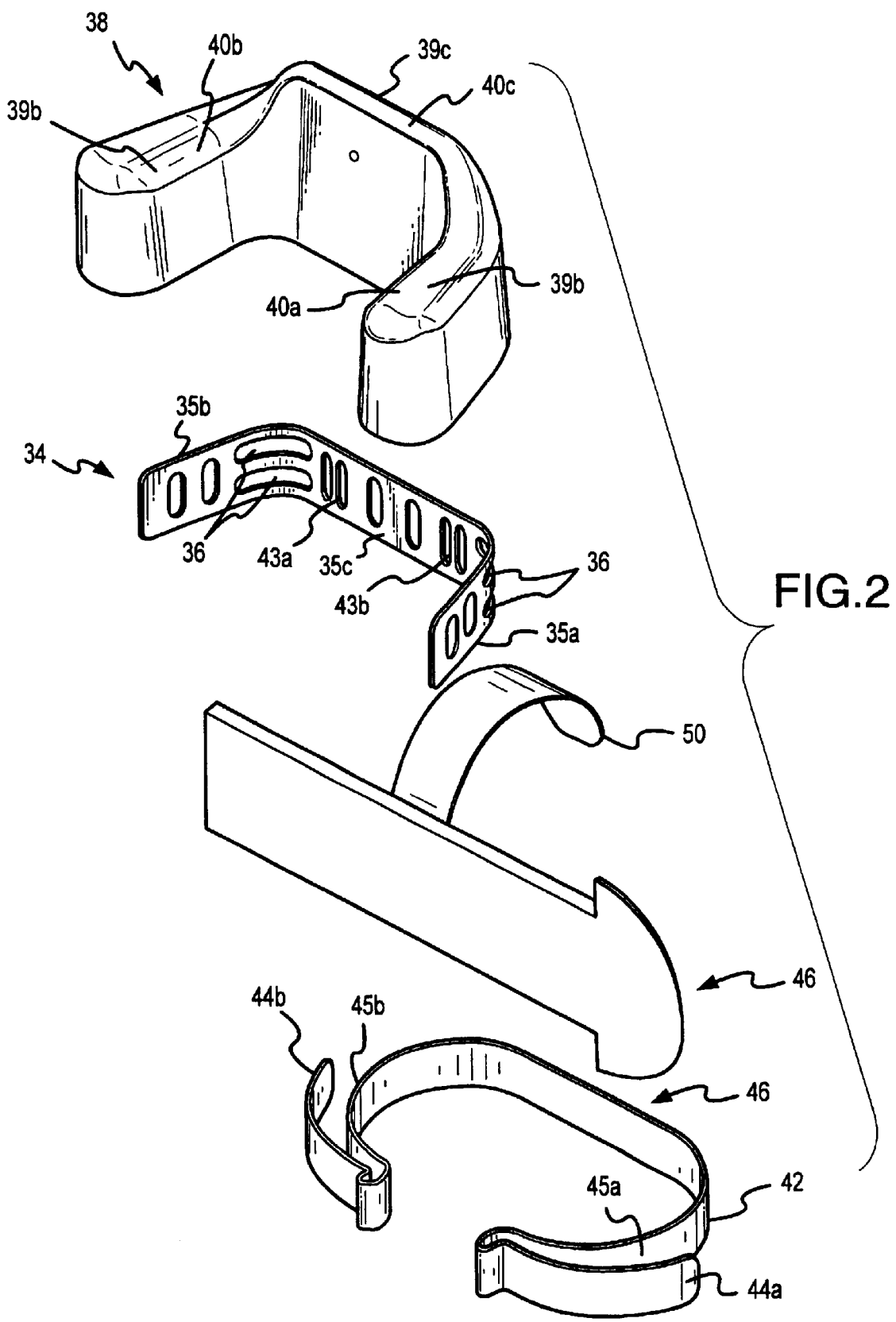

HEADREST

RELATED APPLICATION

This application is a continuation-in-part of U.S. application Ser. No. 09/374,077, filed on Aug. 12, 1999 now U.S. Pat. No. 6,123,389, which claims the benefit of U.S. Provisional Application Ser. No. 60/096,426, filed Aug. 13, 1998, both of which are hereby incorporated by reference in their entirety herein.

FIELD OF THE INVENTION

The present invention generally relates to headrests, and in particular, headrests for use in connection with seats, such as car seats and airplane seats and the like.

BACKGROUND OF THE INVENTION

Generally, a passenger in a passenger vehicle, such as an automobile, airplane, bus or train, suffers significant neck strain when resting since seats in such passenger vehicles typically provide support only to the back portion of the passenger's head. More specifically, since seats in such passenger vehicles are not designed to keep the passenger's head in a substantially upright, vertical orientation relative to the passenger's torso (e.g., when the passenger is at rest or sleeping), neck strain may result due to the natural instability of an unsupported head when no muscles are being used to support the head.

In order to alleviate such neck strain, various devices have been developed. For instance, pillows designed to fit around the backside of the passenger's neck have been developed. Such neck pillows are inflatable with air or consist solely of a foam material. However, such neck pillows generally do not provide adequate support to inhibit neck strain due to their readily deformable or "sponge-like" nature. Further, use of such neck pillows tends to allow the entire body of the user to slide sideways because lateral acceleration causes the passenger's body to slip against the seat. In addition, such neck pillows typically do not allow passengers to adjust the configuration of the device to suit the passenger's tastes or dimensions.

SUMMARY OF THE INVENTION

Accordingly, it is an object of the present invention to provide a headrest which alleviates neck strain.

It is a further object of the present invention to provide a headrest capable of supporting at least a side portion and/or a back portion of a person's head.

It is another object of the present invention to provide a headrest which is releasably securable to chairs or passenger seats in various vehicles, such as automobiles, buses, trains and airplanes.

It is another object of the present invention to provide a headrest which is portable and easily storable.

It is still another object of the present invention to provide a headrest which is adjustable to suit a passenger's tastes or dimensions.

It is yet another object of the present invention to provide a headrest which is interconnectable to a back support portion of a passenger seat and which replaces existing headrests.

In one aspect, the present invention is embodied in a headrest for use in various land-based and air-based vehicles, such as automobiles, buses, trains and airplanes. Generally, the headrest of the present invention may include a frame comprising a back member for supportably engaging at least a back portion of a person's (e.g., passenger's) head and first and second wing members for supportably engaging first and second side portions, respectively, of the person's head, and a first interconnecting member for attaching at least the back member to a seat. The first and second wing members function to inhibit neck strain by supporting first and second side portions of the passenger's head (e.g., cheekbone portions), respectively, when the passenger falls asleep (depending upon to which side the passenger's head is leaning). In one embodiment, the first and second wing members are integrally formed with first and second end portions of the back member as a unitary structure. In another embodiment, the first and second wing members are pivotally interconnected to first and second end portions of the back member, respectively. In both of these embodiments, the first and second wing members, in cooperation with the back member, provide a rigid structure or frame to support a person's head when such person's head falls to one side or the other when such person falls asleep. In addition, such headrest may be utilized in various configurations due to the adjustability of the first and second wing members. By virtue of this arrangement, virtually uninterrupted sleep may be achieved without substantial neck strain since the headrest of the present invention can supportably engage either or both sides of a person's head with the wing members. In an alternative embodiment, the headrest of the present invention includes only a single wing member interconnectable to the back member.

More specifically, in one embodiment, the headrest includes a substantially C-shaped or U-shaped frame and an interconnecting member for attaching the frame to a seat, such as a passenger seat utilized in automobiles, airplanes, buses and trains or an office-type of chair. In this embodiment, the rigid frame includes a back member for supportably engaging at least a back portion of a person's head and first and second wing members integrally formed with the back member at first and second end portions of the back member. Such wing members are capable of supportably engaging first and second side portions of the person's head. The frame may comprise a rigid or semi-rigid material having a modulus of elasticity (e.g., at least about $10^6$ psi) and/or a yield strength of between about 3,000 psi and about 30,000 psi. In this regard, the first and second wing members may be bent relative to the back member, such that the size of the cavity defined by the first and second wing members and back member is variable. As such, due to the adjustability of the first and second wing members relative to the back member, various head sizes and configurations of the head support may be achieved while providing support to either side of an unsupported head at rest. The wing members are generally 6–7 inches in length from the back member to the tips of the wing members. The headrest of the present invention may also be used as a support device in other applications (e.g., lumbar area in automobile seats, the thoracic/rib cage area or the leg or seat area of automobile seats, or alternatively, hospital beds, Rotorest™ or any lateral motion therapy bed). Such a support may be utilized in other seats, such as dental chairs to locate or position a patient's head in a fixed position, massage tables, chiropractic chairs and tables, and physical therapy tables (e.g., to strengthen the patient's neck if injured and in need of physical therapy by applying torque to the wing members). Other uses of the support include recliner chairs, chaise lounge chairs and infant or children's seats (e.g., car seats).

In another embodiment, width adjustability of the headrest is provided by first and second hinge members, which hingedly interconnect the first and second wing members, respectively, to first and second end portions of the back member, respectively. In order to provide such adjustability, such that the first and second wing members are capable of supporting first and second side portions of a person's head, the first and second hinges may include a pivot adjustment mechanism for releasably maintaining the first and second wing members, independently, at any of a plurality of pivot positions relative to the back member. In this regard, the first and second wing members may be moved to desired configurations/positions relative to the back member and releasably fixed in such configurations/positions to support first and second side portions of a person's head when resting. Such adjustment not only provides comfort to the user, but also may facilitate easy storage of the headrest by providing a foldable headrest (e.g., a headrest capable of lying flat), which occupies less space than other conventional headrests. In one embodiment, the hinge members comprise unbalanced hinges requiring less torque to move the first and second wing members inwardly than to move the first and second wing members outwardly, towards an unfolded, open configuration. Such hinges (e.g., clutch spring hinge) also function to dampen the loads to provide a more comfortable ride to the user. In an alternative embodiment, adjustability of the wing members is provided by motorizing the wing members by placing a geared motor(s) proximate the hinges interconnecting the wing members to the back member. Such geared or coupled motor(s) enables the user to easily adjust the angle of each wing member relative to the back member. In yet another embodiment, the hinges are adapted to allow the wing members to not only move inwardly and outwardly relative to the back member, but also upwardly and downwardly (i.e., vertically) relative to the back member, to thereby allow the wing members to be stowed along the ends (i.e., sides) of the back member. In this embodiment, such hinges may further include a pin joint or may otherwise comprise a ball joint. Alternatively, the hinges may be adapted to allow the wing members to move only upwardly and downwardly relative to the back member, the wing members being oriented in fixed relation relative to the back member at about 20 degrees to allow a person's head to rest against one or both wing members. For purposes of providing a light-weight yet durable headrest, the first and second wing members and/or the back member may comprise a light-weight metal, such as aluminum, wood, composites, or a plastic, such as high density polyethylene (HDPE).

The headrest of the present invention may be interconnected to a passenger seat of a vehicle in various fashions, depending upon whether the headrest of the present invention is to replace a removable headrest interconnected to a back seat portion of a passenger seat, or is to be utilized as a kit-type of add-on to an existing headrest of a passenger seat. In one embodiment, in instances where the headrest of the present invention will replace a conventional removable headrest, the interconnecting member for attaching the headrest to the back seat portion of the passenger seat comprises at least a first post or stem (e.g., blade) which is interconnected or integrally formed with the back member of the headrest. Such post or stem may be configured to be received within an existing post-receiving channel which extends vertically through at least a portion of the back seat portion of the passenger seat. Such posts or stems are particularly useful when combined with the headrest of the present invention to provide lateral support to users when subjected to torque loading. In instances where the headrest will be attached to an existing, conventional headrest of a passenger seat, the interconnecting member may comprise a first strap adapted to extend around the perimeter of the conventional headrest. Such strap may be of a non-slip nature (e.g., non-slip suede, vinyl, or other similar high coefficient of friction material) and include at least a first fastening mechanism, such as Velcro, buckles, clamps, cinches, etc. for securing the strap about the conventional headrest of the passenger seat. Such non-slip material inhibits migration of the headrest relative to the seat.

For purposes of providing comfort to the passenger, the headrest of the present invention may further include padding and a cover. In one embodiment, where the frame comprises a unitary, integrally formed structure, the padding may include a molded foam member which is receivable over the frame, such that the frame is not exposed or otherwise contactable with the passenger's head. In order to provide sufficient comfort while supporting a person's head, in one embodiment, the padding has 25% impact load deflection (ILD) of between about 1.0 to about 3.5 and, in a preferred embodiment, between about 1.6 to about 2.5. In one embodiment, the 25% ILD of the padding is about 2.3. In one embodiment, the padding comprises a gel or foam material, such as a Tempurepedic™ foam (e.g., a heat sensitive, highly conformable polyurethane). In another embodiment, the padding may comprise first and second layers, whereby the first layer of padding has a durometer greater than the second layer of padding, the first layer of padding in abutting relation with the frame. In addition, in order to enhance adherence of the padding to the frame, the frame may include a plurality of hollowed or cut out areas while reducing the potential for delamination and damage to the headrest. Alternatively, the padding may comprise separate foam members each covering a specific portion of the frame. For example, first and second wing foam members may cover the first and second wing members, respectively, while a back foam member covers the back member. The padding may also include a neck roll for abuttingly engaging a back portion of a user's head (e.g., protrusion on lower, back area of person's head, about the neck area). Such neck roll functions to position or align the user's head with the wing members and further to be the primary loading point on the back of the user's head. The neck roll enhances positioning of the wing members relative to the user's eyes, such that the user can see over the wing members due to neck roll functioning as the primary locator point. In other embodiments, the padding of at least the wing member is a sound absorbing foam adapted to inhibit noise penetration (e.g., when the wing members are positioned over the user's ear(s)). In another embodiment, the first and second wing members include first and second sound speakers, respectively, which are in electrical communication (e.g., via a standard jack phone system) with a portable stereo or other similar device (e.g., automobile stereo, airplane sound system, etc.). Alternatively, such stereo system may be battery-powered 33 and incorporated into the headrest. In still another embodiment, the first and second wing members may include commercially available noise cancellation circuitry that is adapted to cancel ambient noise by generating 180 phase shifted frequencies to those ambient, thereby canceling the noise at the user's ear(s). In yet another embodiment, the wing members may include a sound system adapted to generate repeating or constant frequencies that are soothing to listeners. Such sound system may be positioned in the wings or in the back member with controls (e.g., knobs) on the backside (e.g., non-head supporting) surface of the wings for easy control access during use. In still another embodiment, the headrest may include a pitch control mechanism, to provide further comfort to the user, such pitch control to allow the headrest to roll forward on a pawl that supports the headrest in a first, forward position until it is rolled fully forward at which point the pawl is released to allow the headrest to go back to an aft position.

In another aspect, the present invention is related to a portable headrest which is adapted for use on a seat having an upper portion of a seatback for engaging the backside of a person's head. Generally, the present invention includes first and second wing portions capable of abuttingly engaging first and second side portions of a person's head, respectively, a neck support member capable of supporting or engaging a neck portion of the person's head or a base of the head portion of the person, the neck support member interconnecting or extending between the first and second side portions, and an interconnecting member for interconnecting the headrest to the seatback. Advantageously, the portable headrest of the present invention is designed to allow, if desired, the backside of a person's head to be supported by the existing headrest or upper portion of the seatback (e.g., of a seat in vehicle or airplane). In this regard, the present invention is based, at least in part, upon applicant's recognition of a problem with various existing headrests, which can position a user's head undesirably forward of the user's torso or back due to the fact that a number of existing headrests utilize a thick pad (in addition to the headrest or upper portion of the seatback) to supportably engage the backside of a person's head and the fact that the headrest or upper portion of seatback in newer model cars are typically positioned forward or proximal the back support portion of the seatback. Alternatively, in the event such support is desired (e.g., in instances where the existing headrest on an upper portion of a seatback is not configured to be oriented forward or proximal a back support portion of the seatback), the present invention accommodates such by providing a releasably securable pad adapted to be interconnected to the headrest of the present invention to abuttingly engage the backside of a person's head.

In one embodiment, the interconnecting member comprises a first strap routable through first and second swivels mounted on the first and second portions of the neck support member. Such configuration allows the headrest of the present invention to be securely interconnected to the upper portion of a seat while facilitating independent movement of each of the first and second wing portions to desired pivot positions. In this regard, the pivot positions of the first and second wing portions may be adjusted without having to remove the headrest from the seat and/or without having to loosen the strap. Such first strap may be secured about the perimeter of the upper portion of the seat, or alternatively about the rear or back side of the upper portion of the seat, with the neck support member abuttingly engaging the front side of the upper portion of the seat to securely interconnect the headrest of the present invention to the seat.

The portable headrest may further include first and second torsion springs for pivotally interconnecting the first and second wing portions to the first and second end portions of the neck support member, respectively, in order to allow the wing portion to be angularly adjusted to various desired positions. In this embodiment, for purposes of adequately supporting the person's neck while allowing the first and second wing portions to support side portions of the person's head (e.g., proximate the cheek bones), the first and second end portions of the neck support member extend vertically upwardly relative to the horizontally extending center portion of the neck support member. Such first and second wing portions may be interconnected to the neck support member's end portions via the first and second torsion springs, respectively. In an alternative embodiment, the first and second wing portions are integrally formed with the neck support member to provide a unibody frame.

Furthermore, for purposes of providing a lightweight headrest, the neck support member and/or the first and second wing portions may be tubular. For these embodiments, the neck support member and/or first and second wing members may be fabricated from a lightweight metal, such as aluminum, or a plastic material. Padding may be positioned on the wing portions and/or the neck support member to comfortably support the sides of the user's head and/or the neck of the user, respectively.

In another aspect, the present invention is directed to a portable headrest adapted to be releasably securable to a headrest or upper portion of a seat's seatback. In one embodiment, the headrest is adapted to be easily and efficiently securable to the upper portion of a seat's seatback with or without the use of straps or other interconnecting devices. In this embodiment, the portable headrest includes first and second wing portions adapted to supportably or abuttingly engage side portions of a person's head, a center member positioned distally relative to the first and second wing portions for engaging a back surface of the seatback (e.g., an upper portion of the back surface of the seatback), and first and second intermediate portions extending between the first and second wing portions and the first and second end portions of the center member, respectively. The portable headrest in this embodiment allows a user to rest the backside of the person's head against the front surface of the upper portion of the seatback, if desired. In order to releasably secure the headrest of the present invention to the upper portion of the seatback, the first and second intermediate portions are substantially U-shaped. In one embodiment, the first and second intermediate portions are configured to compressively engage (e.g., pinch) the upper portion of the seatback to hold the portable headrest of the present invention in place. In particular, the first and second intermediate portions may each include opposing first and second legs the first and second legs being spaced apart at least a first distance (e.g., proximate the center member), the first distance being less than the space between the front and back surfaces of a selected portion of the upper portion of the headrest. The first and second wing portions, first and second intermediate portions and the center member may be integrally formed to provide a unibody frame. In an alternative embodiment, the first and second wing portions are pivotally or hingedly interconnectable to corresponding end portions of the first and second intermediate portions via torsion springs. The portable headrest of the present invention may further comprise first and second wing pads positionable on the first and second wing portions, respectively, to provide comfort to the user. In an alternative embodiment, the headrest may be configured such that the center member engages a top portion of the seatback, and a strap may be utilized to secure the headrest to an upper portion of the seatback.

In another embodiment, the first and second wing portions of the headrest of the present invention are configured/designed in order to inhibit injuries to a person's head in the event of a collision. More specifically, the first and second wing portions may have a scoop configuration, wherein the tip or end portion of the wing is off-axis, such that if the wing is positioned 90 degrees relative to the center or neck support member, in the event of a collision, or sudden breaking, the impact force has a moment outside of the hinge which should cause the wing portion or member to swing away. In another embodiment, the wing members are collapsible scoops, in configuration, such that the scooped wing member acts as a crush zone (e.g., the wing member may comprise plastic which would buckle or bend under an impact). Such a collapsible wing member also has a straight or non-curved configuration.

BRIEF DESCRIPTION OF THE DRAWINGS

FIG. 2 is an exploded view of the headrest illustrated in FIG. 1;

DETAILED DESCRIPTION OF THE INVENTION

FIGS. 1–4B illustrate the various features and characteristics of the present invention. Generally, for purposes of supporting a person's head when such person falls asleep in a seated or prone position (e.g., when seated or lying down in a car seat, train seat, airplane seat, bus seat, etc. or a chair), the headrest of the present invention generally includes a rigid or semi-rigid frame having first and second wing members and a back member interposed therebetween, and at least a first padding member interposable between the person's head and at least one of the first and second wing members and back member. Due to the support provided by the rigid or semi-rigid frame, neck strain is substantially inhibited or otherwise reduced.

Figure 1:
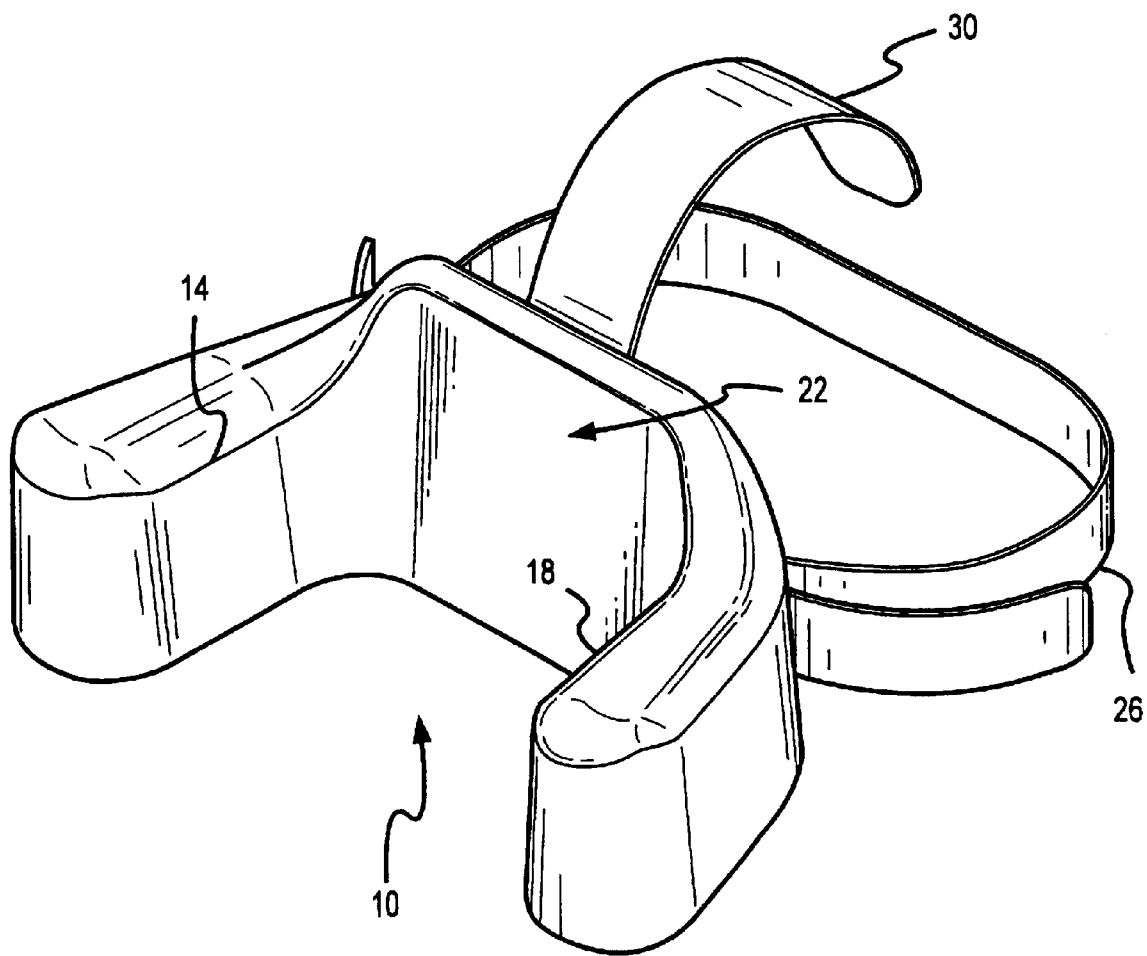
FIG. 1 is perspective view of one embodiment of the headrest of the present invention.
Figure 3A:
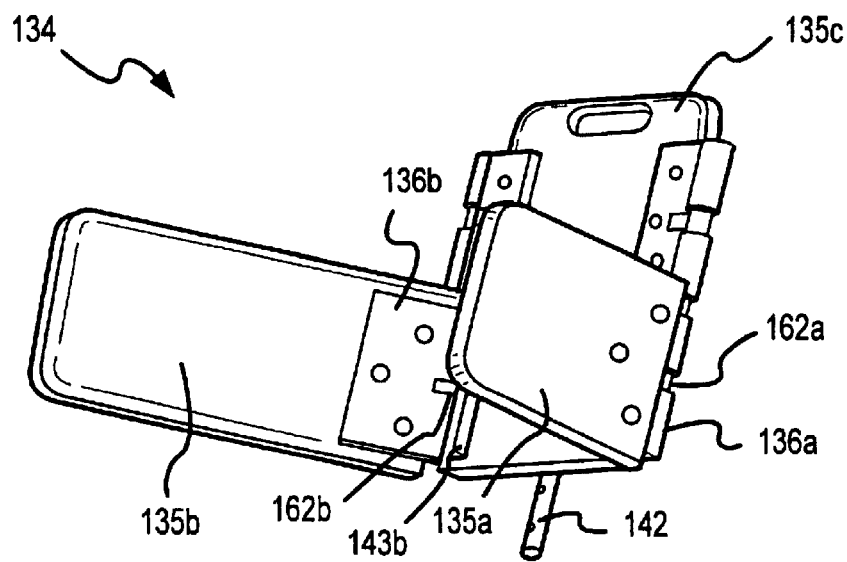
FIGS. 3A–3B are perspective views of another embodiment of the frame of the headrest of the present invention.
Figure 3B:
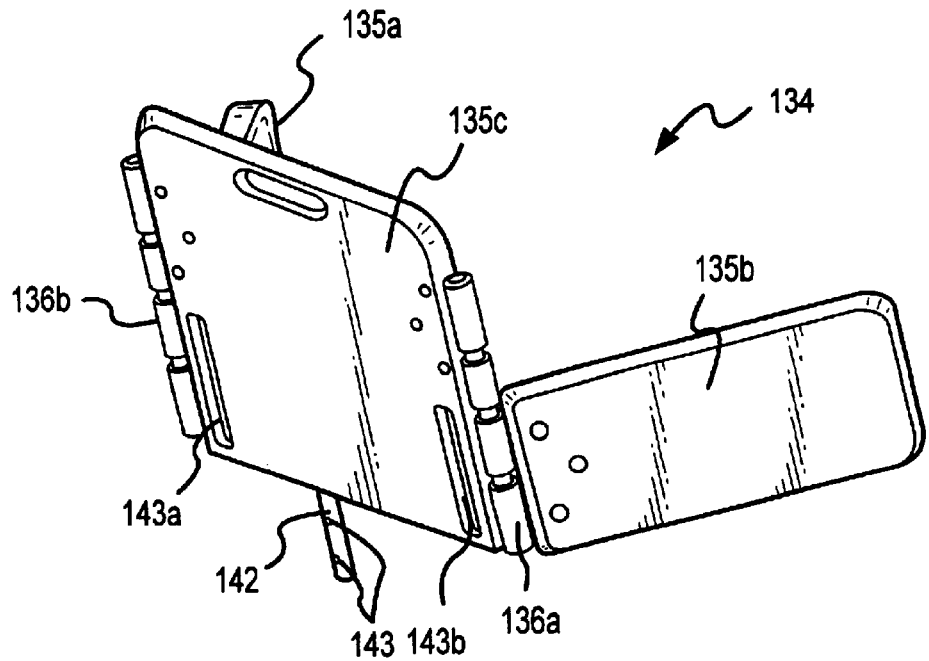

Referring to FIGS. 1–2, in one embodiment of the headrest of the present invention, the headrest 10 generally includes first and second side or wing portions 14, 18 for supportably engaging side portions of a person's head, especially when the person is seated, a back portion 22 for supportably engaging a back portion of a person's head, especially when at rest, and an interconnecting member 26 for securing the headrest to a seat. For purposes of inhibiting slippage of the headrest 10 relative to a seat, in this embodiment, the headrest 10 further includes a pitch restraint member 30 which is adapted to engage (e.g., in a pressure fit manner) a top portion of the seat (e.g., an existing headrest portion of the seat).

More specifically, and referring to FIG. 2, the headrest 10 of this particular embodiment of the present invention includes a semi-rigid or rigid frame 34, a padding member 38 and a strap 42 for interconnecting the headrest to a seat. For purposes of adequately supporting a person's head, and in particular a person's head when the person is asleep and the head is tilted to one side or the other, the frame member 34 is generally C-shaped or U-shaped, and includes first and second wing members 35a, 35b for supporting a person's head (e.g., side portions of the person's unsupported head) and a back member 35c, which is adapted to provide the interface between the first and second wing members 35a, 35b and the seat, via the strap 42, which is feedable through the vertical slots 43a, 43b of the back member 35c (which will be described in more detail hereinbelow). In this embodiment, the first and second wing members 35a, 35b are integrally formed with the back member 35c. In addition, in order to provide adjustability in the size of the cavity formed by the headrest 10 (e.g., width adjustability), the first and second wing members a 35a, 35b are pivotable relative to the back member 35c. In this regard, the frame 34 may comprise a bendable material, such as aluminum, aluminum alloys, plastic, composite or steel. The frame 34 is sufficiently stiff to support lateral loads of up to 8 pounds (i.e., 40 in.-lbs.) at the tips of the wing members 35a, 35b and to support the weight of the wings. In this regard, the headrest may fold to a flattened configuration if 45 in.-lbs. or more were applied to the wing members. Such a headrest provides safety features as it would buckle under light impact loads to the tips of the wing members (i.e., column strength is weak) and 45 in.-lbs. under lateral loads. Such frame may be fabricated from a thermoplastic elastomer, such as Hytrel. Alternatively, the frame may be fabricated from a shape memory alloy, such as nickel titanium, which could provide for some adjustability of the wing members relative to the back member. As such, the frame member 34, and specifically, the first and second wing members 35a, 35b are capable of being bent relative to the back member 35c, in a hinge fashion, and are capable of substantially maintaining such orientation relative to the back member to suitably support a head at rest thereon. Such width adjustability is enhanced by providing at least one cut out or slotted area 36 in each hinge area of the frame member 34. Advantageously, the first and second wing members 35a, 35b are independently movable relative to each other and the back member 35c, which enables a user to move the wing members to any of a number of desired positions relative to each other and to the back member 35c. It should be noted that such cut out areas 36 also function to ensure that the padding member 38 is anchored to the frame member 34 as portions of the padding member 38 proximate such cut out areas 36 fill such cut out areas 36.

The strap 42 generally functions to interconnect the frame member 34 to a seat or chair. In this embodiment, and referring to FIGS. 1 and 2, the strap 42 is receivable within the slots 43a, 43b of the back member 35c, and comprises a hook and loop fastener (e.g., Velcro) to secure end portions 44a, 44b of the strap 42 to intermediate portions 45a, 45b of the strap 42, respectively, whereby a middle portion 46 of the strap is loopable around a back portion of a seat. Use of such a strap 42 allows for a quick and efficient installation onto a seat without endangering passengers positioned in back of the seat. Alternatively, the strap may include one or more buckles, cinches, clamps and other similar fastening devices for attaching the headrest 10 onto a seat. Such strap 42 enables the headrest 10 of the present invention to be secured to substantially any type of in-place existing headrest of a seat, such as automobile seats, airplane seats, train seats, bus seats, office chairs and other similar types of seat structures.

As noted hereinabove, the headrest 10 also includes a padding member 38. In one embodiment, the padding member is a molded foam headrest. The frame member 34 may be molded into the padding member 38. Generally, the inner surfaces of the first and second wing portions 39a, 39b of the padding member 38 are fully radiused so that side portions of an unsupported head of a person can contact the headrest at virtually any angle, from horizontal to vertical, in a comfortable manner. The back portion 39c of the padding member 38 transitions to the wing portions 39a, 39b in a relatively large radius, upon which an unsupported rear portion of a head may be supported. Further, in this embodiment, for purposes of adequately supporting a person's unsupported head, the padding member 38 has a 25% ILD between about 1.6 and about 2.6, and more particularly, between about 1.8 and about 2.4. In a preferred embodiment, the 25% ILD of the padding is about 2.1. Alternatively, in order to enhance comfort, a first layer in contact with the frame member 34 may comprise a stiff, light weight foam while a second layer interposable between the head of a person and the first layer may have a softer, lower durometer to provide a softer, more cushioned support. Finally, the padding member 38 is configured to adequately support the back portion of a person's head while supportably engaging cheekbone portions of a person's head. More specifically, the padding member 38 is configured such that the top surface 40c of the back portion of the padding member is higher than the top surfaces 40a, 40b of the wing portions 39a, 39b.

Optionally, and as illustrated in FIG. 2, the headrest 10 may further comprise a cover 46 for enhancing comfort and for facilitating cleaning of the headrest 10. In one embodiment, the cover comprises leather, lycra, cotton, vinyl, Polartec® or other similar materials. The cover is removable and should be washable for hygiene purposes. In addition, the cover should be configured to snugly fit about the padding member 38 and may additionally include slots on the backside thereof to accommodate the strap 42. The headrest 10 may further include a pitch restraint member 50 interconnectable to the cover or frame. The pitch restraint member 50 is a vertical strap interconnectable to the top part of the back member 22, the strap 52 being loopable over the top of the headrest 10 and releasably attachable to the cover 46 via a fastener (e.g., Velcro, snap, buckle, etc.). The pitch restraint strap 50 provides a three point mount to secure the headrest 10 to a seat headrest, which inhibits rolling down of the headrest 10 when a user leans against one of the wing members 35a, 35b.

In another embodiment, illustrated in FIGS. 3A–5, the headrest is adapted as a replacement for existing removable headrests on automobile-type seats. Generally, the headrest 110 illustrated in FIG. 5 includes first and second side portions 114, 118, a back member 122 and an interconnecting member 142 for securing the headrest to an existing seat. More specifically, and referring to FIGS. 3A–3B, the headrest includes a semi-rigid or rigid frame 134 comprising first and second wing members 135a, 135b which are pivotally interconnectable to a back member 135c via hinge members 136a, 136b, and first and second wing pad members 139a, 139b for covering first and second wing members 135a, 135b, along with a back pad member 139c for covering the back member 135c. Also included is an additional neck roll pad 139d on the back pad member 139c for abuttingly engaging a or lower area of the backside of a person's head. In this embodiment, the first and second wing members 135a, 135b and the back member 135c function to provide a rigid support structure for supporting an unsupported head of a person at rest or seated, substantially as described hereinabove with respect to the embodiment illustrated in FIGS. 1–2. In this regard, the first and second wing members and back member 135a, 135b, 135c may comprise a rigid material, such as aluminum, plastic, steel or other composite. The wing members 135a, 135b are generally rectangular in shape, and have a height less than that of the back member 135c. In addition, for purposes of reducing viewing interference when a user wishes to look sideways, such that the user can rest while looking over the wing members, the neck roll pad 139d is positionable between the upper and lower walls of the wing members 135a, 135b. Advantageously, the width of the back member 135c is about 6.5 inches, plus or minus 0.5 inch, such that the head of the user will be comfortably received within the cavity of the headrest without having to adjust the wing members 135a, 135b inwardly to such a degree (e.g., 80 degrees or more relative to the back member) that the wing members become a safety concern, especially in instances of acceleration or deceleration where the head may be forced back toward the headrest. Of importance, in this embodiment, the hinge members 136a, 136b function to allow pivotal or hinged movement of the wing members 135a, 135b relative to the back member 135c. Such pivotal movement of the first wing member 135a is independent of the pivotal movement of the second wing member 135b to provide numerous comfort configurations for the user. Such hinge members 136a, 136b also allow the headrest 110 to be used or otherwise stowed in a flattened configuration (e.g., 180 degrees relative to each member, or otherwise folded to provide a compact, easily storable headrest). Although the degree of rotation of the first and/or second wings may be varied relative to the front surface of the back member 135c, for safety reasons, rotation of the first and second wing members 135a, 135b, in a preferred embodiment, is limited to less than about 250 degrees relative to a front surface of the back member 135c.

In one embodiment, the first and second hinge mechanisms 136a, 136b comprise unbalanced hinges (e.g., springs with definable friction consistent over a range of motion, such as clutch springs, torsion springs, etc.), whereby a first torque is required to rotate the first and second wing members 135a, 135b inwardly, towards the front surface of the back 135c, and a second torque different than the first torque is required to rotate the first and/or second wing member 135a, 135b outwardly, away from the front surface of the back member 135c. The first torque may be less than the second torque. For instance, the first torque required to rotate the first and/or second wing members 135a, 135b inwardly is about 25 inch pounds while the second torque required to rotate the first and/or second wing members 135a, 135b outwardly, relative to the back member 135c is about 35 inch pounds. In this regard, the hinge mechanisms 136a, 136b, in cooperation with the first and second wing members 135a, 135b and the back member 135c can support an unsupported head of a person while maintaining their respective position and/or orientation relative to each other. In another embodiment, the hinges may comprise a hinge mechanism which is adapted to allow the first and/or second wing member to be rotated inwardly and/or outwardly relative to the front surface of the back member 135c, such that the first and/or second wing members 135a, 135b are substantially parallel to the back member 135c to facilitate storage of the headrest. In this embodiment, the hinge mechanisms 136a, 136b define hinge axes which are coplanar and parallel to each other. In another embodiment (not shown), the hinge axes may be coplanar and not parallel to potentially provide enhanced comfort to a user. In addition, the first and second hinge mechanisms may be balanced hinges. Further, in still another embodiment, the hinge mechanism may comprise an adjustable coil mechanism.

For safety purposes, the wing members can be limited in their degree of motions. In this regard, the headrest 110 further includes first and second wing rotation stops 162a, 162b which function to ensure that the wing members 135a, 135b do not close (i.e., rotate inwardly). The wing rotation stops 162a, 162b thus prevent the wing members 135a, 135b from rotating beyond a selected orientation relative the back member 135c, which is especially useful in instances (e.g., accidents) during sudden braking or deceleration where the user may be thrown back against the headrest 110. As such, the wing rotation stops 162a, 162b limit the wing members 135a, 135b from rotating inwardly or forwardly relative to the back member 135a beyond a selected angle (e.g., 70 degrees). In one embodiment, the wing rotation stops 162a, 162b include a bar comprising metal or other high strength material mountable to the end portion of the back member, the bar adapted to bear upon the wing members when the wing members 135a, 135b rotate inwardly. Alternatively, the wing rotation stops 162a, 162b comprise a roll pin or dowel mounted on each of the spindles of the tension spring plates (i.e., hinges) varying the position of the wing members 135a, 135b relative to the end portions of the back member (e.g., extending the distance between the wing member mounting holes and the back member), or by mounting a bar or a rod between the two plates of each hinge, such bar being mounted along the axes of the hinge spindles but offset the diameter of the spindles and material to enable it to swing until contacting the hinge plate of the other section. In still another alternative embodiment, high durometer foam wedges are positionable on the front faces of the wing members. Such wedges may be bonded or glued to the wing members, and would allow the wing members to rotate no more than 70 degrees forward (e.g., from a flat configuration) with 45 degrees of the 70 degrees being limited by the wing frame and the remaining 25 degrees by the wedge for each wing member. The headrest may alternatively include an automatic wing retraction system (e.g., if wings are motorized) which would function to retract the wings to a flat configuration (e.g., substantially planar with back members) when sudden acceleration or deceleration is sensed. In this regard, the wing retraction system may include a "g" sensor or an airbag type of trigger sensor to initiate retraction of the wings.

Figure 4A:
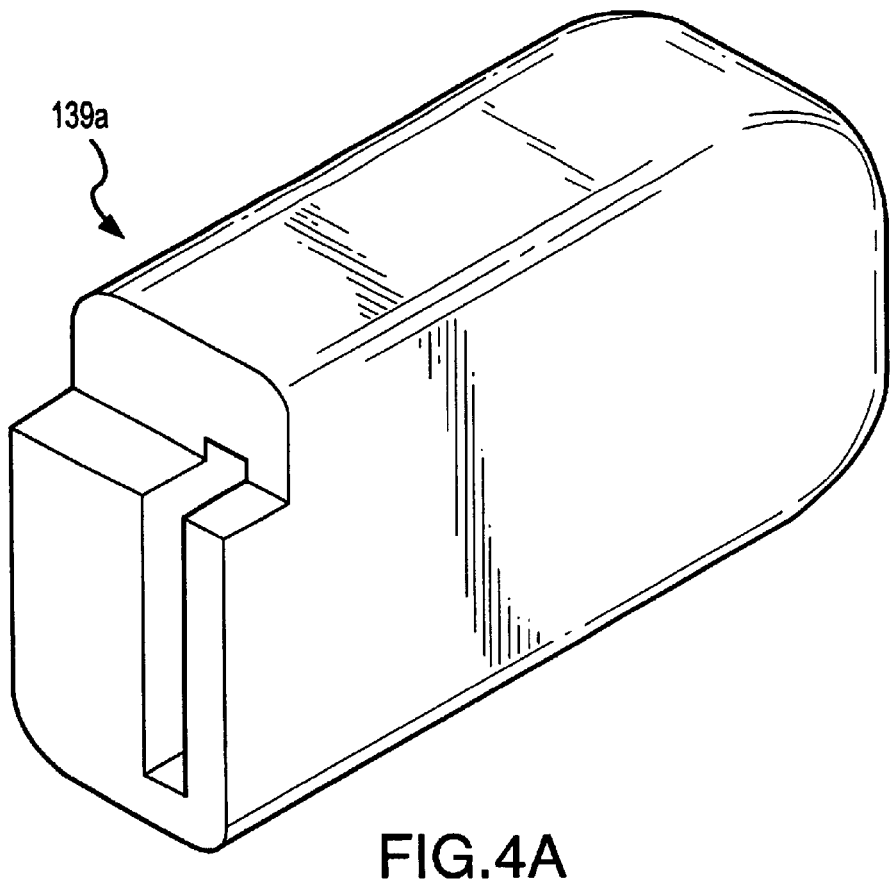
FIGS. 4A–4B are perspective views of the padding of the headrest of the present invention.
Figure 4B:
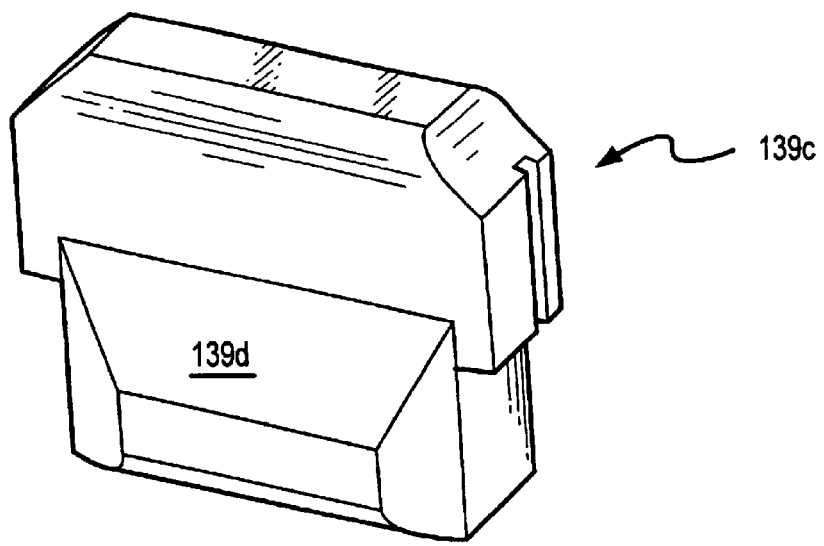
Figure 5:
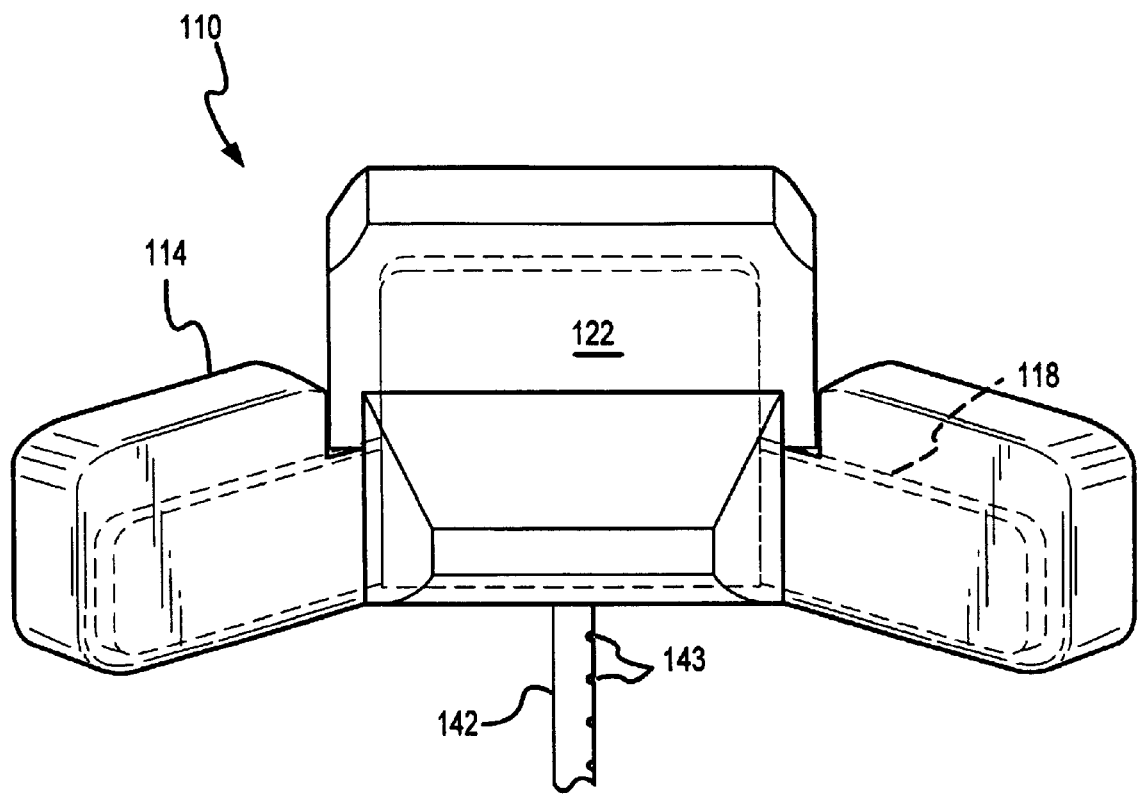
FIG. 5 is an embodiment of the headrest of the present invention.

In the embodiment illustrated in FIGS. 3–4, the interconnecting member comprises one or more stems or rods attached to the base of the back member 135c. In this regard, the headrest may replace existing removable headrests in automobile seats or other similar type seats. Such stems or rods 142 may comprise a metallic material such as steel, to adequately support a head during rear-end collisions (e.g., for automobile applications) and while the user is at rest. Such rods 142 may also include a plurality of notches to provide height adjustability of the back member relative to an automobile seat interconnected thereto, since such automobile seats typically include a channel or tube for receiving such rods 142 and a height adjustment mechanism operatively mounted with such notches 143. In an alternative embodiment, the headrest may instead include a strap for securing the headrest to a seat or headrest portion of an existing seat. Such a strap is positionable adjacent to the hinge axes defined by the first and second hinges 136a, 136b and may be looped through slots in the back member 136c, substantially as described hereinabove with respect to the embodiment of the headrest illustrated in FIGS. 1–2. In the illustrated embodiment, the back member 136c includes insert areas which allow the strap to be positioned close to the hinges, such that the mounting strap is located largely along or about the hinge axis. Such insert area enhances stability. The headrest may further include a releasable locking mechanism (e.g., a tab on the hinge) for locking the first and/or second wing members in at least one of various positional orientations relative to the back member 135c.

Figure 17A:
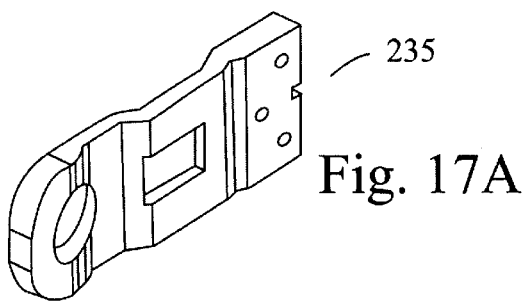
FIGS. 17A–17B illustrate still another embodiment of the wing members of the present invention.
Figure 17B:
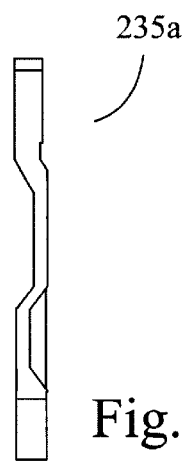
Figure 18:
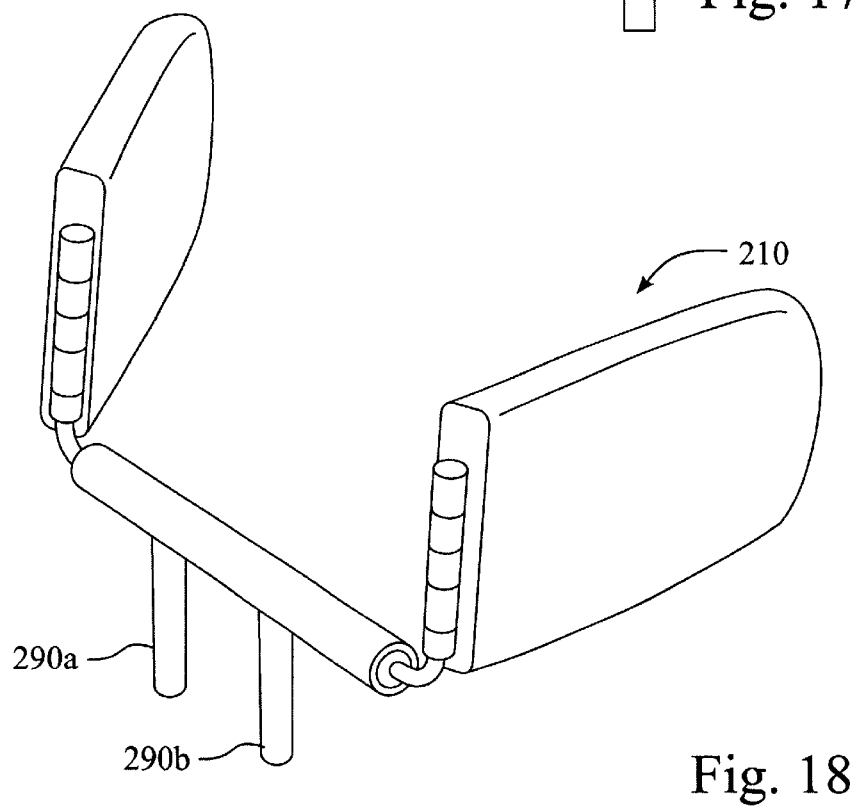
FIG. 18 illustrates another embodiment of the headrest of the present invention, with the interconnecting members being stems.

FIGS. 6–18 illustrate additional embodiments of the headrest of the present invention. Referring to FIGS. 6, 7, 8A–8C, 13 and 14, in one embodiment, the headrest 210 of the present invention generally includes a frame 220, padding covering portions of the frame 220 which engage side portions of a person's head and a neck portion of the person, and an interconnecting member for securing or interconnecting the portable headrest to a seatback. More specifically, the headrest 210 includes first and second wings 214, 218 for supportably engaging side portions of a person's head, especially when the person is seated, and a neck portion 224 capable of abuttingly or supportably engaging a portion of the neck of a person. In particular, the frame includes a rigid neck support member 230 which extends between and interconnects first and second rigid wing members 235a, 235b at first and second vertically extending end portions 238a, 238b of the frame which are integrally formed with the neck support member 230. In order to secure the portable headrest 210 to an upper portion of a seatback, the headrest 210 further includes a first strap 226 which is loopable through first and second swivels 270a, 270b, which correspond to the hinge axes about which the first and second wings 214, 218 are pivotally moveable relative to the neck support member 224. Advantageously, movement of the wing members 214, 218 is accomplished independently of the first strap 226, such that loosening of the first strap 226 is not required to move the wing members 214, 218 to the desired pivot positions. Such swivels 270a, 270b are interconnectable to the first and second hinges 234a, 234b, respectively. As with previous embodiments, the first strap may include a releasable fastener, such as a snap, clasp, or Velcro in order to secure the first strap 226 around an upper portion of the seatback to releaseably secure the portable headrest 210 thereto. Alternatively, and as illustrated in FIG. 18, the headrest 210 may include first and second stems 290a, 290b which are receivable within channels of the seatback (not shown) to interconnect the portable headrest 210 to a seatback, substantially as described hereinabove in relation to other embodiments.

As in previous embodiments, the wings 214, 218 are angularly adjustable to accommodate varying positions of comfort for the user. In this embodiment, and as noted hereinabove, the wing members 235a, 235b are pivotally interconnected to the first and second end portions 238a, 238b via first and second hinge mechanisms 234a, 234b. In this embodiment, and as discussed hereinabove with regard to other embodiments, such hinge mechanisms may comprise torsion springs. In addition, in order to inhibit injury to a person's head, especially during severe deceleration or in the event of a collision, rotation stops 280a, 280b may be utilized to prevent the wing members 235a, 235b from rotating more than a desired angular orientation (e.g., 70° relative to the neck support member). Such rotation stops may be knurled press fittings which are interconnectable to the first and second end portions 238a, 238b.

Of importance, the headrest 210 of the present invention utilizes the neck portion 224 to support a neck of a person (as opposed to a backside of a person's head). In one embodiment, the neck portion 224 includes the center member 230 and a pad 250 positioned thereover to provide comfort to the user. In this embodiment, the neck portion is substantially positioned coplanar with lower surfaces 215a, 219a of the wings 214, 218, respectively. In other embodiments, the neck portion 224 is positionable below such lower surfaces 215a, 219a of the first and second wing 214, 218, respectively. As such, the backside of a person's head may be abuttingly engageable with the existing upper or headrest portion of the seatback. In this regard, the portable headrest 210 of the present invention accommodates late model vehicles which typically position a headrest or upper portion of a seatback forward or proximal the back support portion of the seatback in order to minimize whiplash injuries. The present invention also accommodates older model cars which do not employ forwardly positioned headrest portions of seatbacks by providing a first pad member 260 having a releaseable fastener such as Velcro to releaseably secure the first pad member 260 to the seatback itself or to the strap 226. Such pad member 260 may include foam, or alternatively, be inflatable to provide to the user adjustability in cushioning.

Figure 9:
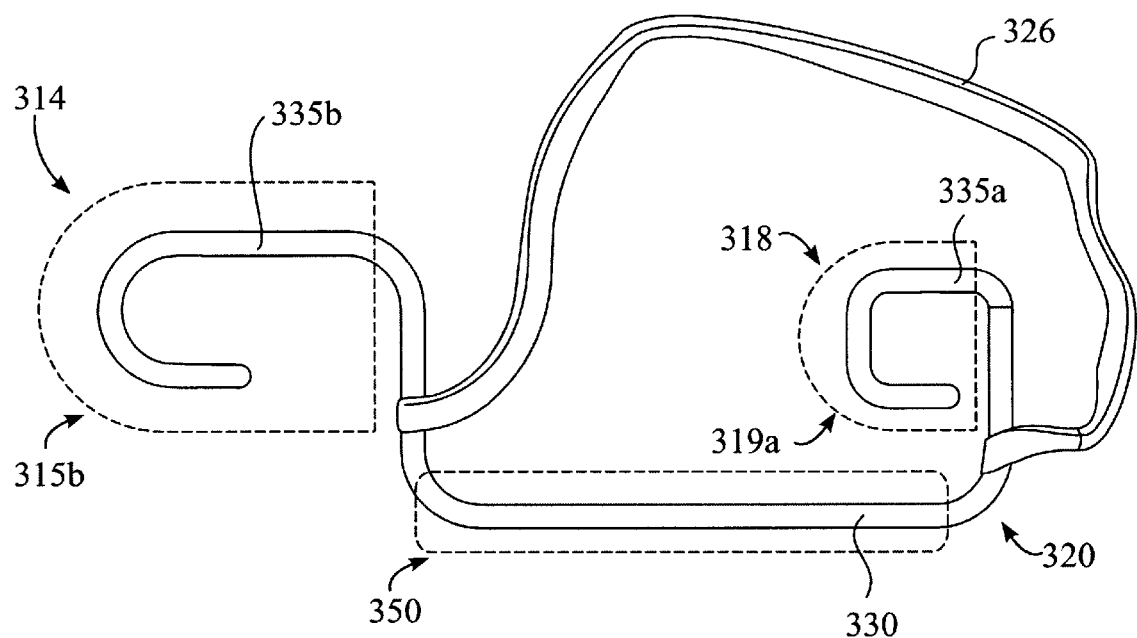
FIG. 9 is a perspective view of another embodiment of the headrest of the present invention, illustrating the unibody frame.
Figure 10:
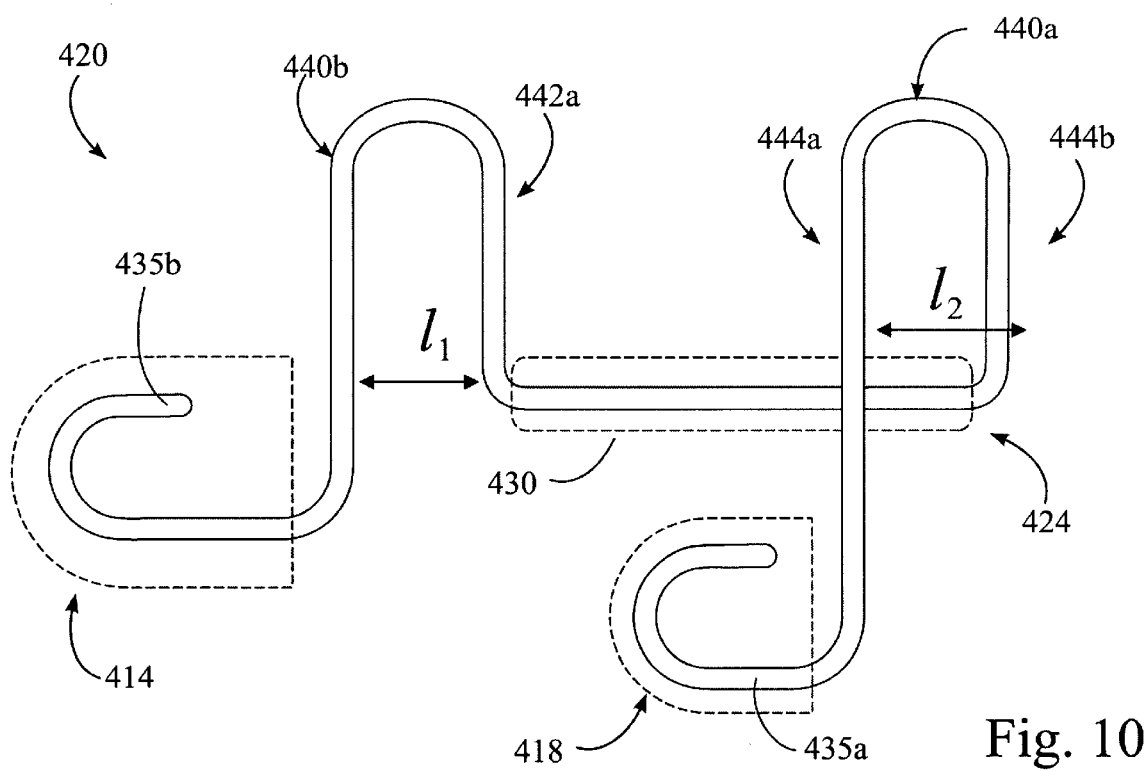
FIG. 10 is a perspective view of still another embodiment of the unibody frame of the headrest he present invention, illustrating the center member positioned distal relative to the wing portions of the frame to clamp over an upper portion of a seatback.

FIGS. 9 and 10 of the present application illustrate alternative embodiments of the frame of the portable headrest of the present invention. In one embodiment, the frame 320 is a unibody frame in which the center neck support member member 330 is integrally formed with the first and second wing members or portions 335a, 335b to form a unibody frame 320. In this embodiment, the frame 320 comprises a tube fabricated from a metal, such as aluminum, or a hard plastic. The first and second wing members 335a, 335b are angularly fixed relative 320 to the center neck support member 330 at various angular positions desirable for a user to rest their head. As with the above-described embodiment, the center neck support member 330 is positionable at or below a plane defined by the first and second lower surfaces 315a, 319a of the first and second wings 314, 318, respectively, in order to supportably engage the neck portion of a person. In order to provide comfort to the user, the center neck support member 330 includes a pad 350. In an alternative embodiment, the wing portions 335a, 335b are releaseably securable to the center neck support member 330 via appropriate fasteners (e.g., threaded rod, male/female snap/fitting, twist-on attachment, etc.) in order to enhance portability and storability of the headrest. A first strap 326 is used in this embodiment to releaseably secure the portable headrest to an upper portion of a seatback.

Figure 11:
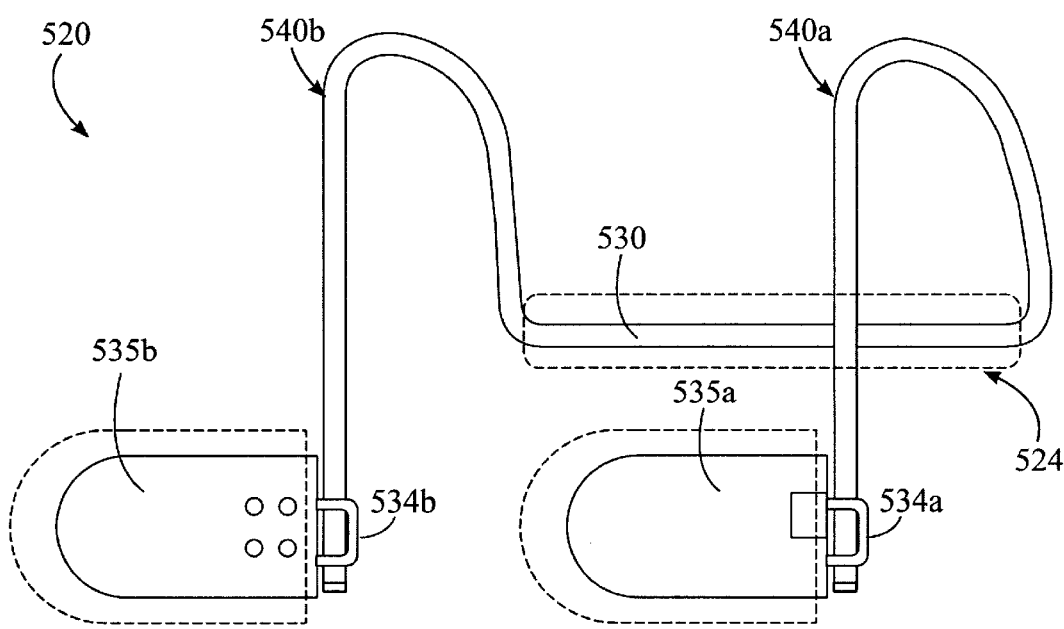
FIG. 11 is a perspective view of another embodiment of the frame of the headrest of the present invention with wing portions being hingedly connected to the frame which is releasably securable to an upper portion of a seatback.
Figure 12:
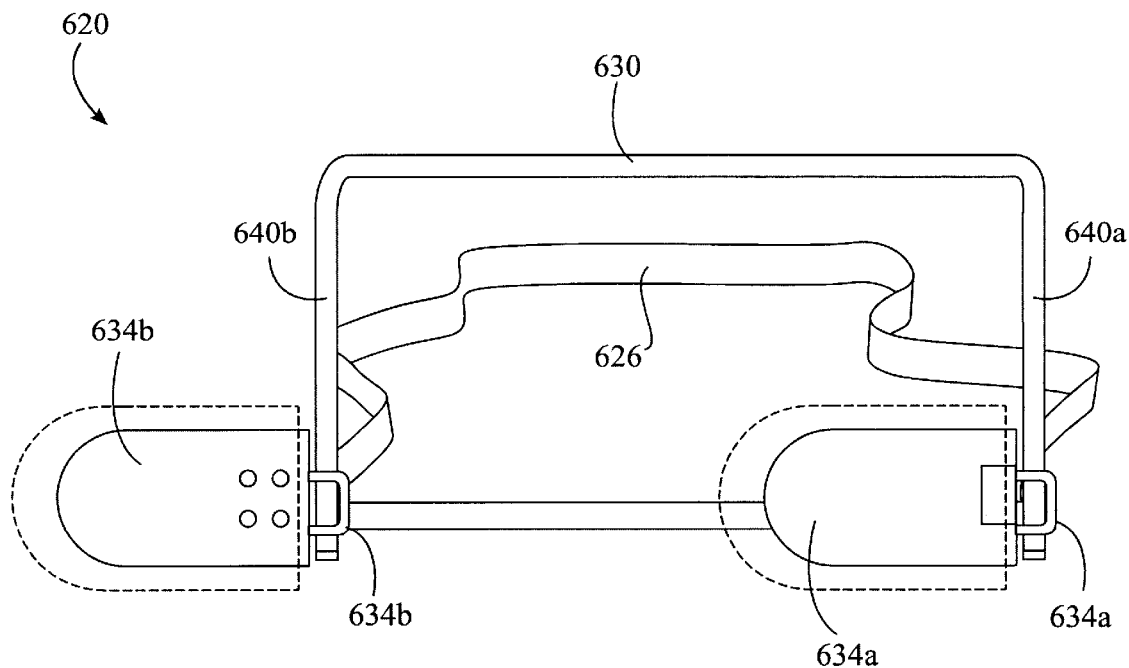
FIG. 12 is a perspective view of another embodiment of the frame of the headrest of the present invention, illustrating the center portion of the frame being positionable on a top portion of a seatback and the wing portions being hingedly connected to end portions of the center portion.
Figure 13:
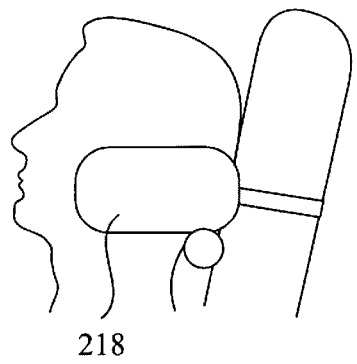
FIG. 13 is a side view of the headrest of FIG. 6 mounted onto an upper portion of a seat, illustrating a person's head being supported thereon.
Figure 14:
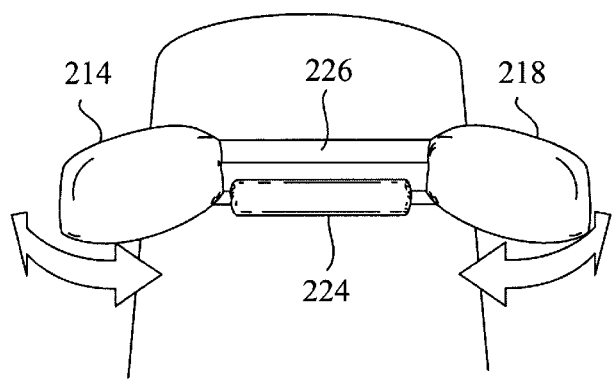
FIG. 14 is a front view of the headrest of FIG. 6 mounted onto an upper portion of a seat.

In another embodiment, illustrated in FIG. 10, the portable headrest of the present invention is designed to be releaseably securable to an upper portion or headrest portion of the seatback without the use of straps or other similar devices. In this embodiment, the headrest includes a frame 420 having a center member 430 which extends between and interconnects first and second wing members 435a, 435b via first and second intermediate portions 440a, 440b, which are generally U-shaped in configuration. Of importance, the center member 430 is positioned distal or behind the first and second wing members 435a, 435b such that the center member 430 is engageable with a backside of the seatback, in the upper portion or headrest portion of the seatback. In order to adequately secure the headrest of the present invention to an upper or headrest portion of a seatback, especially during use, the first and second intermediate portions 440a, 440b are designed to allow the frame 420 to compressively engage or pinch the upper portion of the seatback. In this regard, the first and second legs 442a, 442b and 444a, 444b are spaced apart a distance $1_1$, $1_2$, respectively, which is less than the distance between front and back surfaces of a portion of the headrest or upper portion of the seatback (e.g., proximate the center member 430). FIG. 11 illustrates an alternative embodiment of the frame illustrated in FIG. 10, showing the wing members 535a, 535b being hingedly or pivotally interconnected to end portions of the intermediate portions 540a, 540b of the frame 520. In this embodiment, the hinge mechanisms utilized to provide angular adjustability of the wing members 535a, 535b relative to the center member 530 include torsion springs 534a, 534b. In still another embodiment, illustrated in FIG. 12, the frame 620 of the headrest of the present invention includes a center member 630 which is co-planar with hinge axes defined by the hinges 634a, 634b which hingedly interconnect the wing members 634a, 634b, respectively, to the center member 630 via first and second intermediate portions 640a, 640b. The headrest further includes strap 626 loopable around the intermediate portions 640a, 640b proximate the hinges 634a, 634b.

Figure 6:
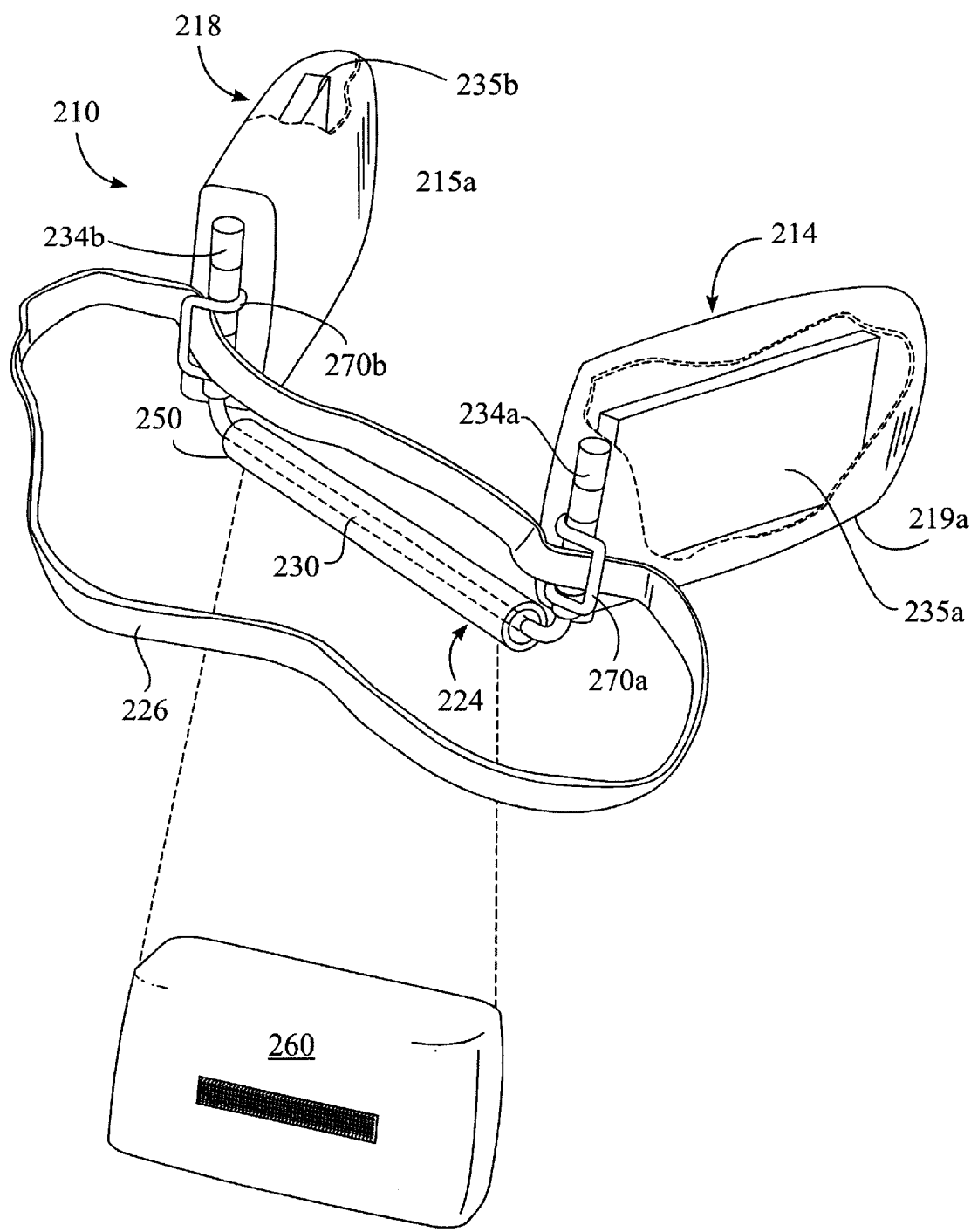
FIG. 6 is a perspective view of the portable headrest of the present invention.
Figure 7:
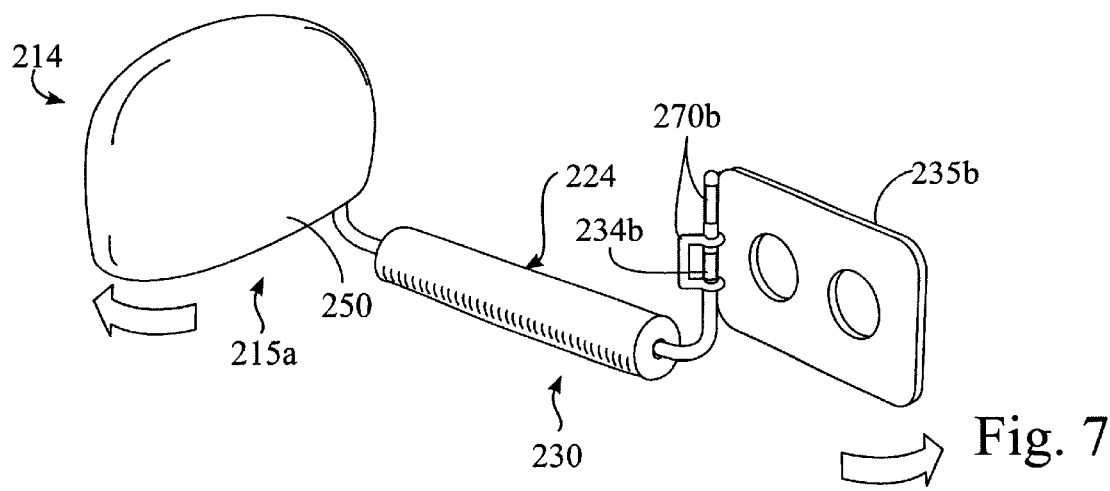
FIG. 7 is a perspective, partially cut-away view of the portable headrest illustrated in FIG. 6.
Figure 8A:
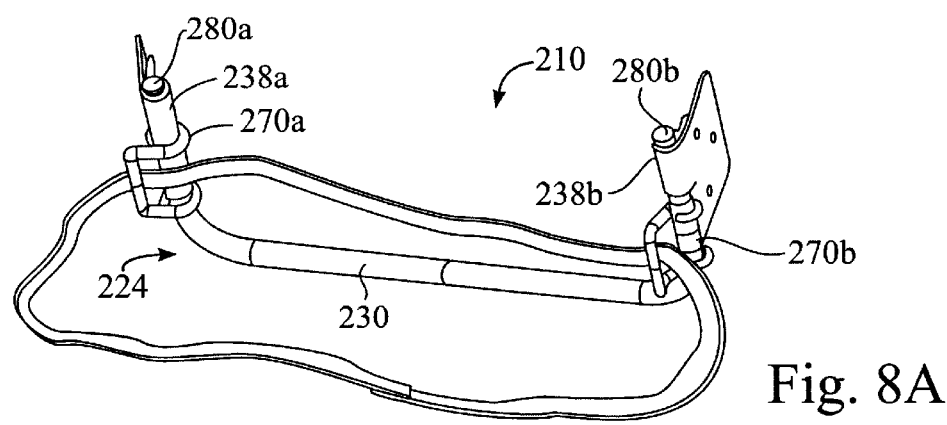
FIGS. 8A–8C illustrate perspective, end and top views of one embodiment of the frame of the headrest illustrated in FIG. 6.
Figure 8B:
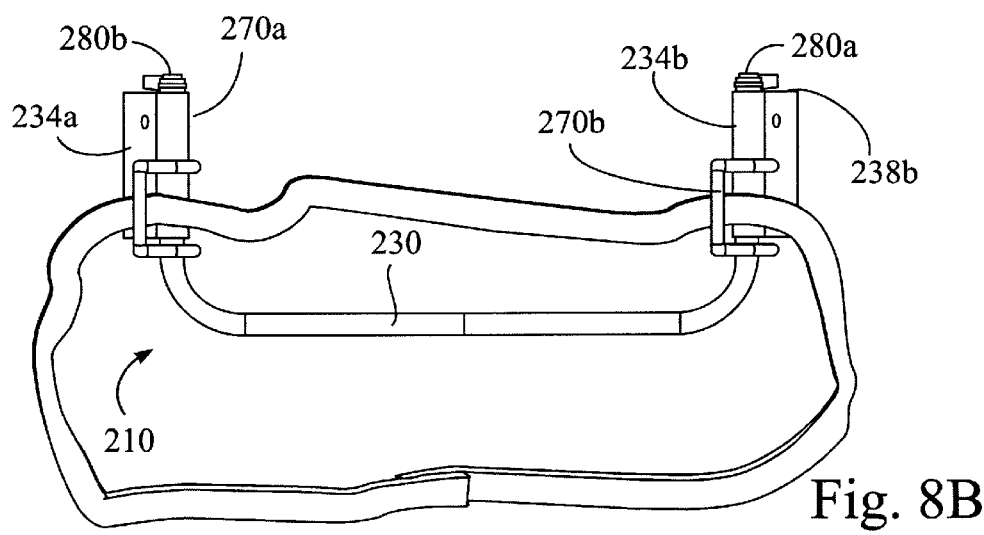
Figure 8C:
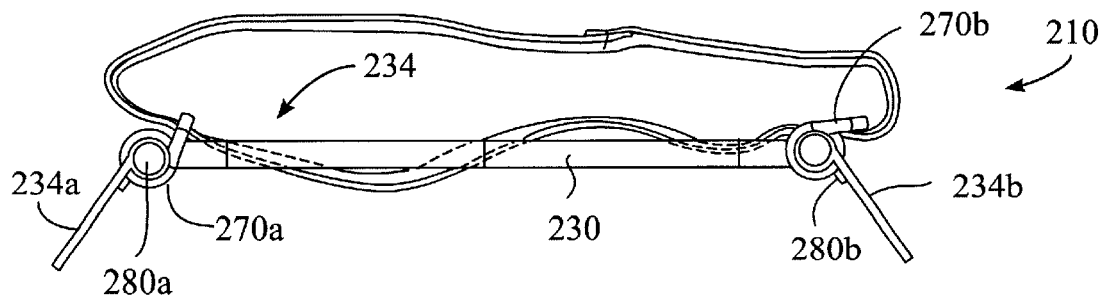
Figure 15A:
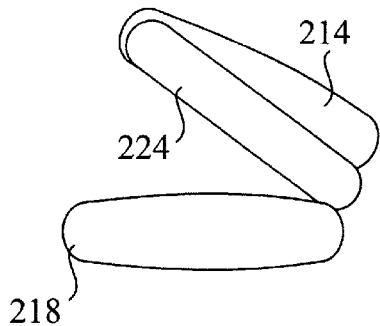
FIGS. 15A–15E illustrate the headrest of FIG. 6 utilized in various configurations, without use of the interconnecting member.
Figure 15B:
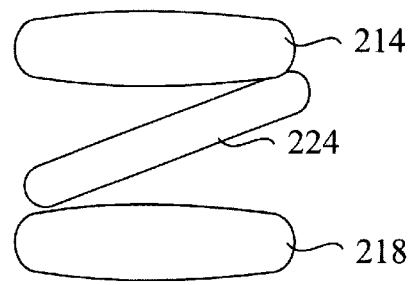
Figure 15C:
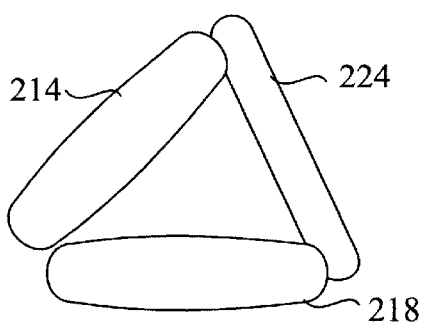
Figure 15D:
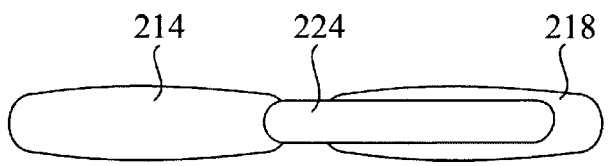
Figure 15E:
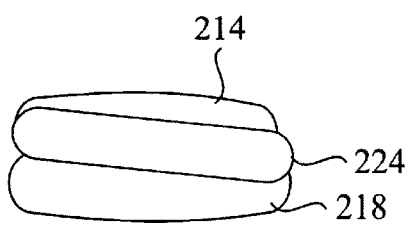

FIGS. 15A–15E illustrate various configurations in which the headrest illustrated in FIG. 6 may be utilized. For example, and referring to FIG. 15A, the headrest 210 of the present invention may be configured and/or oriented to the illustrated configuration, such that the headrest 210 may be utilized between a person's head and shoulder to support the person's head (e.g., whereby the wing member 218 abuttingly engages a person's shoulder and the side of a person's head is supported by wing member 214). FIG. 15B illustrates another alternative configuration of the headrest 10 of the present invention, whereby the headrest 210 in this "Z-shaped" configuration may be placed between a person's head and a window of the vehicle (e.g., airplane window, train window, automobile window, etc.) to support a person's head. FIG. 15C illustrates yet another configuration of the headrest 210 of the present invention, whereby wing member 214 may support a person's head, wing member 218 abuttingly engage a person's shoulder, and neck support member 224 may abuttingly engage the window of a vehicle. FIG. 15D illustrates still another configuration in which the headrest 210 of the present invention may be utilized to support a person's head. In this configuration, the wing member 218 and neck support member 224 may be positioned between adjacent seats (e.g., on the train or airplane), such that the headrest 210 is wedged therebetween, and a person's head is supportable by wing member 214. Finally, FIG. 15E illustrates a folded configuration of headrest 210 of the present invention, such that the headrest 210 is storable in a small, compact arrangement. In this regard, in order to achieve such configurations, the torsion springs interconnecting the wing members to the neck support members may allow 360° rotation.

Figure 16A:
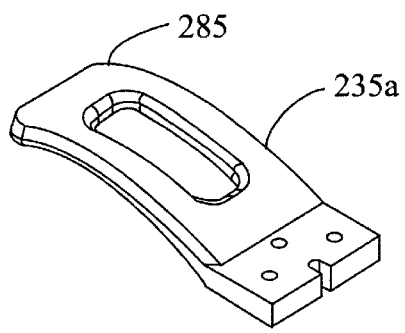
FIGS. 16A–16B illustrate another embodiment of the wing members of the present invention.
Figure 16B:
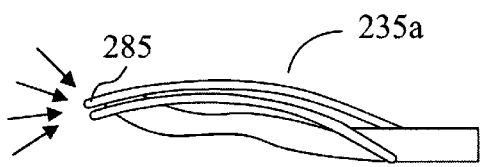

In another embodiment, the wing members are designed to avoid injuring the person utilizing the headrest of the present invention. In one embodiment, the middle portion of the wing member is transverse or offset relative to the end portions or segments of the wing member to facilitate buckling of the wing member when subject to a compressive load (e.g., applied to the end of the wing member). FIGS. 16A–16B and FIGS. 17A–17B illustrate first and second rigid wing members 235a, 235b which provide additional safety to the user. Referring to FIGS. 16A–16B, a curved or scooped wing member is provided to enhance safety. More specifically, the end portion 285 of the wing member 235a is "off-axis," such that in the event of sudden deceleration or a collision, the forces generated thereby would provide a moment outside of the hinge attached to the wing member 235a, which would cause the wing member 235a to swing away and/or buckle. FIGS. 17A–17B illustrate a collapsible wing member 235a which is designed to buckle or bend in the event a person's head impacts the wing member. In this regard, the wing member 235a would act as a crush zone and would plastically yield but not permanently deform. As such, the wing members may be fabricated from a plastic material, such as polyethylene.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best modes known for practice in the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A headrest securable to a seat, said headrest comprising:
    a first and second wing portions capable of abuttingly engaging first and second sides of a person's head, respectively;
    a center member extending between said first and second wing portions, said first and second wing portions being hingedly attached to said center member by respectively a first and second hinge mechanism having sufficient friction to provide a rigid support structure for supporting a weight of a head of a person; and
    first and second strap attachment members, said first and second strap attachment members being coupled to rotate about first and second hinge axes respectively.

2. A headrest, as claimed in claim 1, wherein said center member comprises a laterally extending tube.

3. A headrest, as claimed in claim 2 wherein said laterally extending tube comprises a hollow tube.

4. A headrest, as claimed in claim 1, wherein said center member comprises a substantially laterally extending center portion and first and second longitudinally extending end portions.

5. A headrest, as claimed in claim 4, wherein said first and second hinge mechanisms provide three hundred and sixty degree rotation about said longitudinally extending end portions.

6. A headrest, as claimed in claim 4, wherein each of said first and second hinge mechanisms comprises a single flange member forming a part of respectively said first and second wing portions, each single flange member to rotate about one of the longitudinally extending end portions.

7. A headrest, as claimed in claim 1, wherein the center member comprises a horizontally extending tubular member and padding interposable between at least a portion of said horizontally extending member and the person's neck.

8. A headrest, as claimed in claim 1, further comprising:
    a first pad, releasably securable to said center member, for supporting a back portion of the person's head.

9. A headrest, as claimed in claim 1, further comprising a first strap, said first strap extending between the first and second wing portions, said first strap being loopable through said first and second strap attachment members, wherein said first and second strap attachment members comprise swivels.

10. A headrest, as claimed in claim 1, wherein each of said first and second wing portions include a lower surface defining a first plane, wherein said center member is a laterally extending tube positioned along or below said first plane.

11. A headrest comprising:
    first and second wing portions capable of abuttingly engaging first and second sides of a person's head, respectively, wherein said first and second wing portions include a buckling portion to buckle in response to a compressive load;
    a center member extending between said first and second wing portions.

12. A headrest, as claimed in claim 11, wherein said first and second wing portions each include a second segment extending between first and third segments, said second segments being transverse to said first and third segments to buckle in response to a compressive load.

13. A headrest, as claimed in claim 11, wherein said first and second wing portions each have a first radius of curvature, wherein said first and second wing portions buckle in response to a compressive load.

14. A portable headrest releasably securable to a seat, said portable headrest comprising:
    first and second wing portions for engaging first and second sides of a person's head, respectively;
    a horizontally extending cross member positionable distally relative to said first and second wing portions; and
    first and second intermediate portions extending between said first and second wing portions and first and second end portions of said center member respectively, wherein said first and second intermediate portions are configured to compressively engage a front surface and a back surface of an upper portion of the seatback to releasably secure said portable headrest to the seat.

15. A portable headrest, as claimed in claim 14, wherein said center member, said first and second intermediate portions, and said first and second wing member are integrally formed to provide a unibody frame.

16. A portable headrest, as claimed in claim 14, wherein at least one of said first and second wing portions, said first and second intermediate portions, and said center member is tubular.

17. A portable headrest, as claimed in claim 14, further comprising:
   first and second wing pads interposable at least between the first and second side portions of the person's head and said first and second wing portions, respectively.

18. A portable headrest, as claimed in claim 14, further comprising:
   first and second torsion springs for pivotally interconnecting said first and second wing portions, respectively, to first and second intermediate portions, respectively.

19. A portable headrest, as claimed in claim 14, wherein each of said first and second intermediate portions ire substantially U-shaped and include first and second legs, said first leg being spaced a first distance from said second leg, said first distance being less than a second distance defined by the front and back surfaces of the upper portion of the seatback.

20. A headrest securable to a seat, said headrest comprising:
   first and second wing portions capable of abuttingly engaging first and second sides of a person's head, respectively;
   a support member extending between said first and second wing portions; and
   first and second torsion springs for interconnecting said first and second wing portions to said support member, respectively, wherein said first and second torsion springs are adapted to allow said first and second wing portions respectively, to be rotated 360°, about first and second axes of rotation, respectively.

21. A headrest comprising:
   a first member comprising a center member and a first integrally formed vertically extending end portion and a second integrally formed vertically extending portion;
   a first wing member comprising a first hinge mechanism to pivotally attach said first wing member to said first integrally formed vertically extending end portion, said first hinge mechanism providing sufficient friction over a first range of motion to maintain said first wing member in a first range of positions with a person's head leaning against said first wing member;
   a second wing member comprising a second hinge mechanism to pivotally attach said second wing member to said second integrally formed vertically extending end portion, said second hinge mechanism providing sufficient friction over a second range of motion to maintain said second wing member in a second range of positions with a person's head leaning against said second wing member.

22. The headrest of claim 21 wherein said first wing member comprises:
   a single rigid wing member integrally formed with said first hinge mechanism, wherein said first hinge mechanism pivots about said first vertically extending end portion of said first member; and
   a pad to substantially cover said single rigid wing member.

23. The headrest of claim 22 wherein said first wing member and said second wing member each comprises a buckling portion adapted to buckle in response to a compressive load.

24. The headrest of claim 23 wherein said center member is a neck support member extending horizontally and perpendicular to said vertically extending end portions, and wherein said apparatus further comprises a neck pad for said neck support member.

25. The headrest of claim 21 further comprising:
   a first swivel;
   a second swivel;
   a strap loopable through said first swivel and said second swivel.

26. A headrest comprising:
   a first wing member;
   a back member; and
   a first hinge to allow pivotal motion between said first wing member and said back member, wherein said first wing member is pivotable relative to said black member, and wherein said first hinge provides sufficient friction over a range of motion to unassistedly maintain said first wing member in any of a plurality of positions supporting a user's head, said plurality of positions including multiple positions between a first end position which ends the outward rotation of the first wing member and a second end position which ends the inward rotation of the first wing member.

27. The headrest of claim 26 wherein said first hinge is to unassistedly maintain any of the plurality of positions unless a substantial force is applied.

28. The headrest of claim 27 wherein said substantial force is a torque of about 25 inch pounds.

29. The headrest of claim 28 wherein said first hinge is a balanced hinge and wherein said first hinge requires approximately said substantial force to rotate said first wing member inwardly and outwardly.

30. The headrest of claim 26 wherein said first hinge is an unbalanced hinge requiring a first torque to rotate said first wing member inwardly and a second torque to rotate said first wing member outwardly.

31. The headrest of claim 30 wherein said first torque is about 25 inch pounds and the second torque is about 35 inch pounds.

32. The headrest of claim 26 further comprising a rotation stop to stop inward rotation of the first wing member at a predetermined stop point.

33. The headrest of claim 32 wherein said predetermined stop point is when said first wing member reaches approximately a seventy degree angle with respect to said back member, said seventy degree angle being measured from a line segment aligned with the back member extending outwardly from the first hinge.

34. The headrest of claim 33 wherein said rotation stop comprises a bar mounted to an end portion of the back member to bear on the first wing member when the first wing member rotates inwardly.

35. The headrest of claim 33 wherein said rotation stop comprises a roll pin or dowel mounted on the first hinge.

36. The headrest of claim 33 wherein said rotation stop comprises a bar or rod mounted along an axis of a spindle of the first hinge to contact a hinge plate at the predetermined stop point.

37. The headrest of claim 26 wherein said first hinge comprises:
   a first plate portion forming a part of the first wing member;
   a second plate portion forming a part of the back member;
   a spindle to form an axis of rotation to allow pivotal motion between the first plate portion and the second plate portion, wherein said spindle is integrally formed with said back member.

38. The headrest of claim 33 wherein said rotation stop comprises at least one foam wedge positioned on a front portion of the first wing member.

39. The headrest of claim 26 wherein said first hinge is operable to allow said first wing member to be pivoted outwardly beyond a ninety degree angle from the back member.

40. A headrest comprising:

a first wing member;

a back member; and a first hinge to allow pivotal motion between said first wing member and said back member, wherein said first wing member is pivotable relative to said back member, and wherein said first hinge requires a first torque to rotate the first wing member inwardly and a second torque to rotate the first wing member outwardly, the second torque having a different magnitude than the first torque.

41. The headrest of claim 40 wherein said first torque is about 25 inch pounds and the second torque is about 35 inch pounds.

42. The headrest of claim 40 wherein said headrest is to unassistedly support a users head in a plurality of positions including multiple positions between a first end position which ends the outward rotation of the first wing member and a second end position which ends the inward rotation of the first wing member.

43. A headrest comprising:

a center member;

a first wing member hingedly connected to the center member, wherein said first wing member is pivotable relative to said center member, and wherein a hinging mechanism is to allow pivotal motion between said first wing member and said center member, wherein said hinging mechanism has a defined friction consistent over a range of motion defining a plurality of positions, said defined friction being sufficient to provide a rigid support structure for supporting a head of a person.

44. The headrest of claim 43 wherein said hinging mechanism requires a substantial force to move the first wing member from any of the plurality of positions.

45. The headrest of claim 44 wherein said substantial force is a torque of about twenty five inch pounds.

46. The headrest of claim 45 wherein said hinging mechanism is all unbalanced hinge requiring a first torque to rotate said hinging mechanism inwardly and a second torque to rotate said hinging mechanism outwardly.

47. The headrest of claim 46 wherein said first torque is about twenty five inch pounds and said second torque is about thirty five inch pounds.

48. The headrest of claim 43 wherein said hinging mechanism comprises a spindle, the spindle being integrally formed with said center member, and a journal that rotates about said spindle, said journal forming a part of the first wing member.

49. The headrest of claim 43 further comprising:

a second wing member hingedly connected to the center member opposite the first wing member, wherein said second wing member is pivotable relative to said center member, and wherein a second hinging mechanism is to allow pivotal motion between said second wing member and said center member, wherein said second hinging mechanism has said defined friction consistent over a second range of motion defining a second plurality of positions.

50. A headrest comprising:

a first wing member;

a center member;

a hinge mechanism to allow pivotal motion between said first wing member and said center member, wherein said hinge mechanism has a defined friction consistent over a range of motion, said defined friction being sufficient to provide a rigid support structure for supporting a head of a person.

51. A headrest comprising:

a first wing member;

a center member;

a hinge mechanism to allow pivotal motion between said first wing member and said center member, said hinge having sufficient friction to maintain any of a plurality of positions under a load of a human head leaning against said wing member, said hinge mechanism to yield when a greater load is applied.

* * * * *